Oct. 9, 1962           S. BROUDO           3,057,440
PRESSURIZED HOSE AND ROLLER ASSEMBLY FOR ARRESTING GEAR
Filed April 28, 1961           2 Sheets-Sheet 1
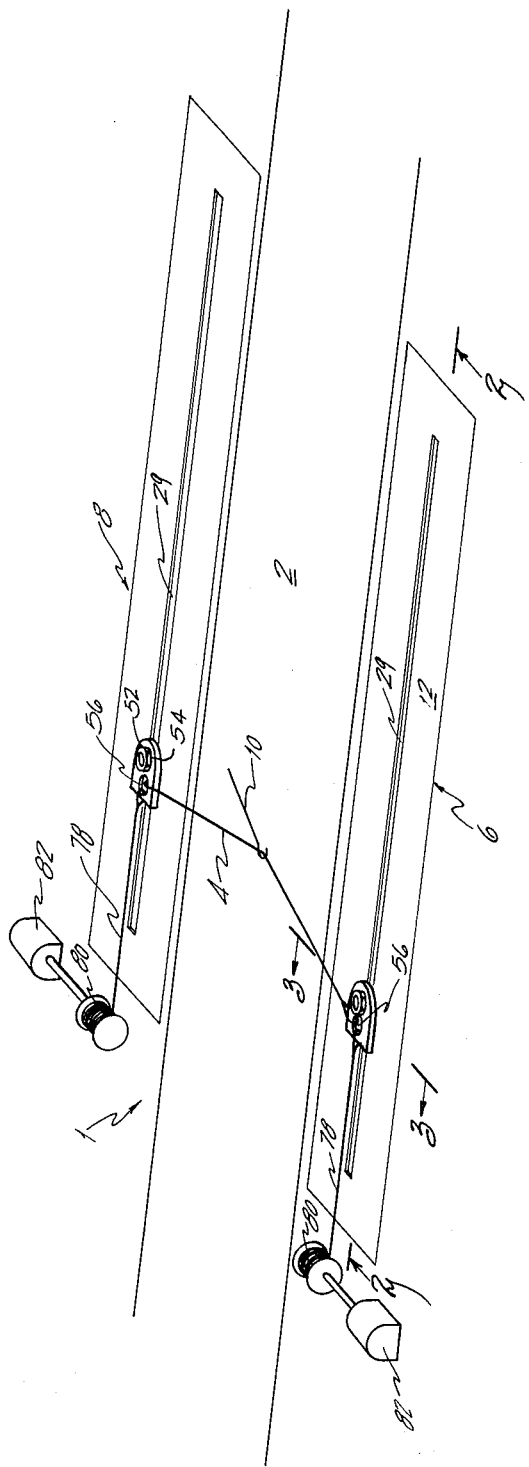
INVENTOR.
Saul Broudo
BY Arthur L. Collins
Attorney

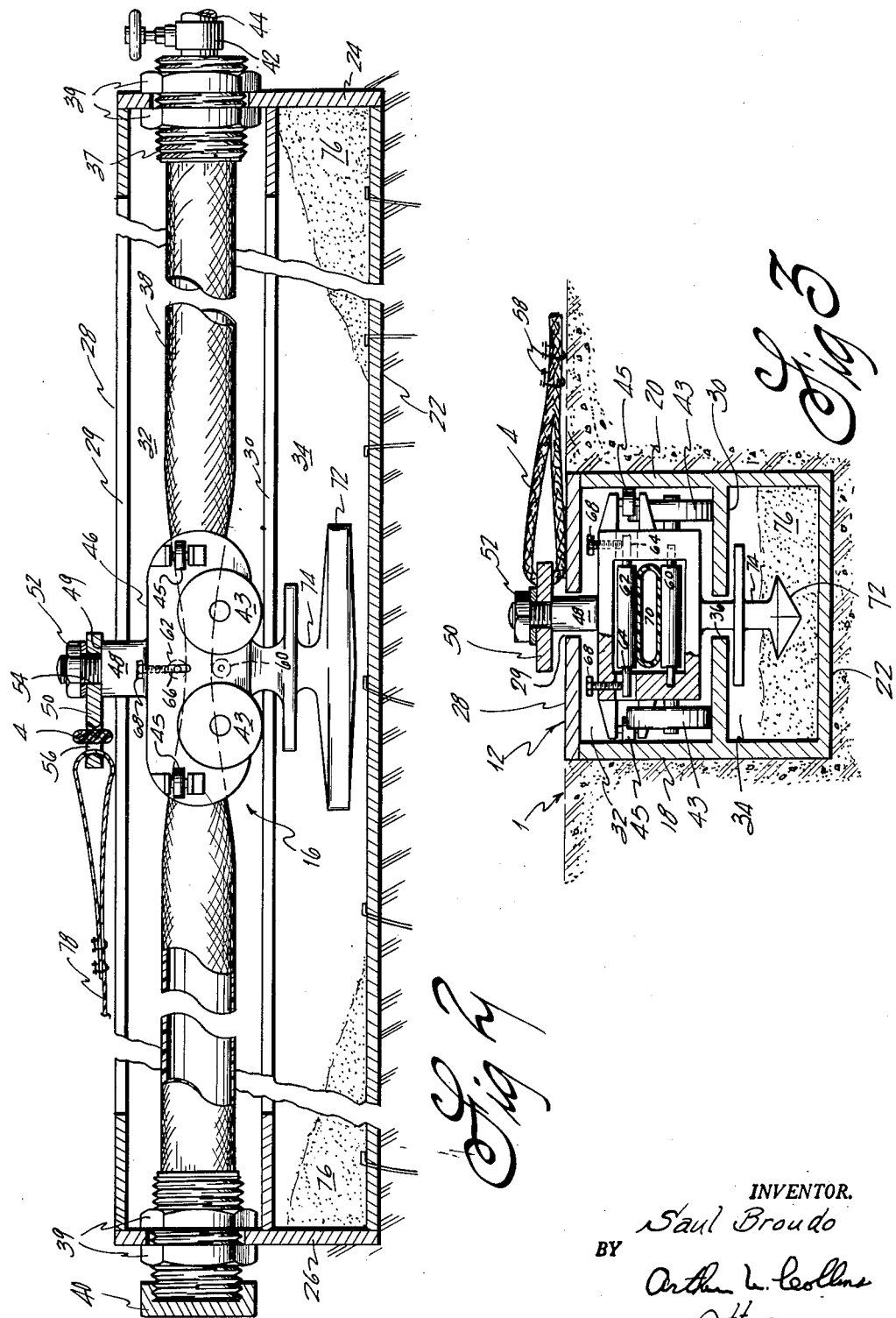

United States Patent Office 3,057,440
Patented Oct. 9, 1962

3,057,440
PRESSURIZED HOSE AND ROLLER ASSEMBLY FOR ARRESTING GEAR
Saul Broudo, Philadelphia, Pa., assignor to the United States of America as represented by the Secretary of the Navy
Filed Apr. 28, 1961, Ser. No. 115,277
6 Claims. (Cl. 188—86)
(Granted under Title 35, U.S. Code (1952), sec. 266)

The invention described herein may be manufactured and used by or for the Government of the United States of America for governmental purposes without the payment of any royalties thereon or therefor.

This invention relates to arresting devices particularly useful in halting the forward movement of aircraft, as in making a landing.

In equipment of this type there is normally a tensioned pendant extending across, and slightly above, the landing surface. This is engageable by a hook suspended by the aircraft to be arrested. The ends of the pendant are connected to an energy absorber which may be an anchor chain, a friction brake, a piston in a hydraulic cylinder, or some other means. Th enery absorber dissipates the energy of the moving aircraft to be halted, when its hook engages the pendant.

While these devices are useful and have certain established advantages most of them are massive, heavy, or require complex power plants which have disadvantages in temporary installations.

With the above in mind, the object of this invention is to provide novel arresting gear utilizing a fluid filled flexible cylinder in which energy is absorbed by passing the fluid through a moving, restricting orifice resulting from cylinder wall deformation by movement of a roller assembly mounted externally of the cylinder.

Another object is to provide arresting gear having a closed-fluid energy absorbing system which requires no access to the fluid and therefore has no sealing problems against leakage at such access.

Another object is to provide such gear in which the moving parts are external of the energy absorber making them readily available for adjustments, repair, and replacement.

A further object is to provide such gear which is adapted to accommodate additional arresting means.

Another object is to provide a novel carriage for a flexible cylinder arresting system.

Other objects and features will be apparent from reading the description hereinafter given with reference to the appended drawings.

In the drawings,

FIG. 1 is a plan view of a landing surface having the invention;

FIG. 2 is a longitudinal section of an energy absorber taken along line 2—2 of FIGURE 1;

FIG. 3 is a cross-section of an energy absorber along line 3—3 of FIGURE 1.

Describing the invention with reference to the drawings, in FIGURE 1, a landing surface 1 is illustrated having a runway 2. An arrest pendant 4 extends transversely across the runway 2 and has its ends connected to energy absorber units 6 and 8. A hook 10, such as is suspended from aircraft to be halted, is shown engaging the pendant 4.

The energy absorber units 6 and 8 are positioned to the sides of runway 2 and extend in the direction of aircraft travel or longitudinally of the runway. Since these units are alike in function and construction and differ only in their location in that one unit is to one side of the runway, to the left as shown in FIGURE 1, and the other unit is on the other side, or the right, a description of one is intended to describe them both.

Each energy absorber unit includes a trackway 12, a pressurized cylinder 14 and a carriage 16.

The trackway 12 (FIG. 3) is a rectangular beam having vertical sides 18 and 20, a bottom 22, ends 24 and 26, and a top 28. These are arranged and interconnected to form a box-like member, closed on all sides except for a slot 29 in the top 28. It is preferred that the top be removably secured (not shown) in some manner for an access into the trackway.

There is also a horiozntal partition 30 secured to the inner surfaces of the sides 18 and 20, intermediate the top 28 and bottom 22 which divides the inner confines of the trackway 12 into an upper chamber 32 and a lower chamber 34. Communication between the chambers is provided through a longitudinal slot 36 in partition 30, which extends for substantially the full length of the partition.

A flexible, non-extensible cylinder 38 (FIG. 2) is disposed on partition 30 in the upper chamber 32 whose wall can be deformed inwardly by an external force. It is filled with a liquid under pressure, such as water, and normally maintains a cylindrical configuration. Preferably the cylinder 38 is made of a rubberized fabric similar in construction to a fire hose. A threaded collar 37 is attached at each end of cylinder 36 which projects through an end plate of the trackway 12 and is secured to it by nut, 39, on either side of it. Caps 40 close the cylinder ends. For initially filling the cylinder 38 with fluid, one of the caps 40 has a shut-off valve 42 with a connected conduit 44 which leads from a source of fluid, not shown.

Carriage 16 is mounted for reciprocable movement within upper chamber 32 of trackway 12. It has a body 46 which is a hollow, open-ended box and has wheels 43 on its outer sides for riding on partition 30. Wheels 45, disposed in a horizontal plane relative the body and cylinder 38, are also provided for riding on the inner surfaces of sides 18 and 20 of trackway 12.

Integrally secured to the top of carriage body 46 is a pin 48 which extends upwardly through slot 29 in the trackway top 28. A portion of pin 48 is above the landing surface 1 and is reduced to form a shoulder 49 on which it carries a swivable, pendant-attaching plate 50. A nut 52 secures the plate 50 against being lifted off pin 48.

Essentially, plate 50 is more or less a rectangular piece of flat metal with its corners rounded and having two circular cut-outs 54 and 56. Cut-out 54 is of a size suitable to accommodate the reduced portion of pin 48; whereas, cut-out 56 provides a means for anchoring pendant 4 to it.

Attachment of pendant 4 to plate 50 may be done in a number of ways. In the drawings it is shown to be performed by passing an end of the pendant through cut-out 56, folding it back on itself, and securing it with U-bolts 58.

The connection between carriage 16 and cylinder 14 is made externally by the passage of the cylinder through the carriage body 46 between a pair of opposed rollers 60 and 62 that are journaled within it. The rollers are in a vertical plane transverse to the cylinder's axes, and the carriage's, but their own axes can be directed anywhere on the plane between the vertical and horizontal directions. In FIGURE 3 they are shown to be horizontally disposed. The shaft ends 64 of one of the rollers, preferably the upper roller 62, are set in vertical slots 66 in the sides of the carriage body 46 and can be moved vertically by turning set screws 68. Normally, the screws 68 are adjusted so that the nip between rollers 60 and 62 is such that the wall of cylinder 14 is depressed inwardly, but not to the extent that fluid cannot flow in the cylinder from one side of the rollers to the other side. An oval-like orifice 70 is, thus, present in the cylinder between the rollers 60 and 62 which is of much smaller area than the cylinder's inflated, internal cross-sectional area.

From the foregoing, it is apparent that when a load is applied to pendant 4, the carriage 14 is moved along the trackway 12 against the resistance offered by the flow of fluid from one side of the rollers, 60 and 62, to the other side by way of the restricted orifice 70. This resistance eventually effects the halting of the carriage and the load applied to it through the pendant 4.

In the event that the load on pendant 4 is of such magnitude that the carriage is moved the full length of cylinder 14, its halting is assured by a secondary braking device. This takes the form of a spear 72 suspended from the underside of carriage body 46 into the lower chamber 34 by a web 74 that protrudes through slot 36 in partition 30. It is a double spear in that it is pointed forwardly and rearwardly of the carriage body 46. It is adapted to be driven into hard, loose material 76, such as sand, which fills the end portions of lower chamber 34 of the trackway 12. The act of the spear 72 entering the loose material 76 provides additional arresting resistance which assures definite halting of the carriage.

After an arrestment, carriage 16 is returned to its original position, that is, the battery end, for instance to the left as viewed in FIGURE 1, by a cable 78 which is connected through cut-out 56 to pendant-attaching plate 50 on carriage 16 and extends rearwardly to a winch drum 80 located near the end of trackway 12. A motor 82, of conventional construction, is provided to rotate drum 80 and wind-up the cable 78 to restore carriage 16 to its original position. Before such wind-up takes place, set screws 68 are turned out to separate the rollers, to increase the orifice 70, and reduce the force necessary to move the carriage.

Following an arrestment, instead of returning carriage 16 by winch 80, if desired, an arrestment may be made of an aircraft moving in an opposite direction to that of the preceding arrested aircraft. In any event, it is obvious that arrestments may be made by the invention of aircraft moving in opposite directions on landing surface 1.

Thus, there is provided a novel arresting device which can arrest objects moving in either direction relative the landing surface, and which has a construction which makes it suitable for temporary installation.

While only one embodiment of the invention has been described and illustrated, it will be understood that various changes in detail and arrangement of parts may be made within the scope of the invention as expressed in the appended claims.

What is claimed is:

1. A force arresting system for halting an object moving along a prescribed path comprising a cable disposed across said path for engagement by said object, hollow, beam-like trackways located on each side of said path, said trackways having a partition therein with a longitudinal slot and defining a lower chamber and a superimposed upper chamber, a carriage having an open-ended body mounted in said upper chamber of said trackways and connected to said cable for towing thereby, a pair of opposed rollers mounted in the body of said carriage, a flexible, non-extensible cylinder having a liquid therein disposed in said upper chamber of each of said trackways passing between said rollers and through said body, said rollers inwardly depressing the wall of said cylinder causing a reduced flow restriction to said liquid, loose material filling the end-of-run of said lower chamber of said trackways, and a spear suspended from said carriage in said lower chamber adapted to be driven into said loose material.

2. The system of claim 1 wherein loose material fills the extremities of said lower chamber and said spear is doubly pointed for being driven into material with movement of said carriage in either direction on said trackway.

3. The system of claim 1 wherein said rollers are adjustable for varying the amount of depressing thereby of said cylinder.

4. The system of claim 3 including a retraction cable connected to said carriage, and means for winding said retraction cable and thereby retrieving said carriage to its battery position.

5. An energy absorber for halting a moving object comprising an elongated, hollow trackway, a sealed, flexible, non-extensible cylinder filled with fluid secured in said trackway, a carriage mounted on said trackway for reciprocable movement therealong and adapted to be connected to said object, means carried by said carriage for inwardly depressing the wall of said cylinder and forming a flow restriction to said fluid, loose material filling the end-of-run of said trackway, and a spear carried by said carriage adapted to be driven into said material.

6. A carriage device for an aircraft system having a flexible, non-extensible cylinder filled with fluid comprising a hollow open-ended body adapted for receiving said cylinder therein and for movement therealong, opposed rollers mounted in said body and transversely thereof adapted for depressing the wall of said cylinder therebetween so as to form a restriction to fluid flow in said cylinder, means for adjusting said rollers and varying the effected depressing of the wall of said cylinder, means extending from said body adapted for attachment to an aircraft arresting pendant, and a spear mounted on said body adapted to be driven into loose material for arresting movement of said carriage.

References Cited in the file of this patent

UNITED STATES PATENTS

| | | |
|---|---|---|
| 2,833,347 | Terry | May 6, 1958 |
| 2,905,430 | Deist | Sept. 22, 1959 |
| 2,930,455 | Williams | Mar. 29, 1960 |
| 2,954,966 | Cushman | Oct. 4, 1960 |
| 2,961,233 | Ullrich | Nov. 22, 1960 |
| 2,971,727 | Haber | Feb. 14, 1961 |
| 2,980,213 | Van Zelm et al. | Apr. 18, 1961 |

FOREIGN PATENTS

| | | |
|---|---|---|
| 1,103,491 | France | May 25, 1955 |